Figure 1:
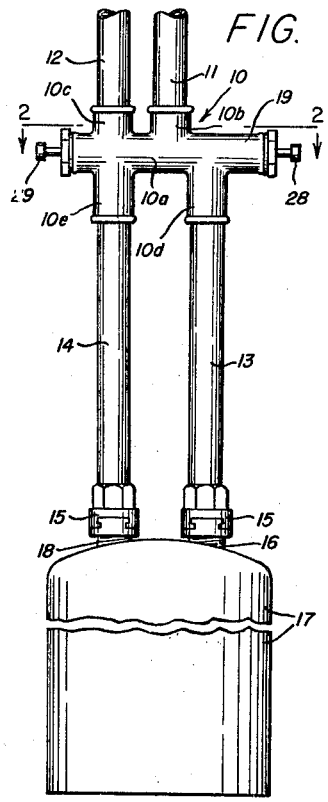

Nov. 7, 1961  J. EVANS  3,007,491
INFLOW-OUTFLOW VALVE FOR TANKS
Filed Oct. 19, 1959

INVENTOR.
JOHN EVANS
BY
ATTORNEYS

United States Patent Office 3,007,491
Patented Nov. 7, 1961

3,007,491
INFLOW-OUTFLOW VALVE FOR TANKS
John Evans, 137 N. 8th W., Salt Lake City, Utah
Filed Oct. 19, 1959, Ser. No. 847,264
10 Claims. (Cl. 137—599.1)

This invention relates to valves adapted to control both the flow into and the flow out of tanks and similar vessels, and is especially concerned with the provision of a valve of this type which will guard against tank leakage in such service tank installations as exchange-tank water softeners and hot water supply systems.

Water softener service rendered to homes, businesses, and industry by companies furnishing the equipment and making periodic calls to exchange of a tank of fresh and active ion-exchange material for a tank of spent material in need of regeneration has become a major business operation in all areas of the country afflicted with hard water supply.

The exchange tanks are subjected to considerable handling, for they must be removed from the place of use every month, trucked to a central depot for regeneration, trucked back to another place of use, and reinstalled in a water supply system. As a consequence, there is a much greater chance for small leaks to develop through the walls of these tanks than there is with the permanently installed tanks of other water systems, although all ion exchange tanks, however installed and whatever the liquid treated, are subject to eventual development of pin hole leaks.

When a leak develops in an ion-exchange tank or the tank of a hot water supply system, considerable damage can be done by the discharged liquid before the leak is noticed. This becomes a problem of critical importance to companies operating water softener service, for they are dependent upon the customer noticing the leak. When customers are away on vacation, extensive damage can easily occur, with resultant customer ill will and, often, heavy costs.

A principal object of this invention is to provide a valve which will automatically close off a service circuit upon the occurrence of even a pin hole leak in the tank and will shunt the supply liquid through a by-pass to the service lines.

A feature in the accomplishment of this object is the utilization of a ball valve member poised between flow-controlling valve seats therefor in a confining flow chamber which is located at the intersection of the by-pass-to-service passage with the tank-inflow passage of an inflow-outflow valve.

An additional advantage of this arrangement is that the service man need not shut off the water supply when exchanging the tank of an exchange tank type of water softener. The ball valve member closes the tank-inflow passage automatically as the exchange is being made.

Another feature of the invention is the provision of manually manipulatable plungers at mutually opposite sides of the ball valve member, for forcibly displacing such member from either one or the other of its seats as desired. This enables a service man exchanging a water softener tank to manually close off the tank circuit and shunt the hard water directly to the service lines when water is being drawn in the establishment concerned, thereby making it unnecessary for him to wait until all utility taps are closed. It also enables him to re-open the tank circuit and close off the by-pass following the exchange of tanks, so as to immediately establish pressure in the exchange tank and determine that it does not leak.

A specific embodiment representing what is presently regarded as the best mode of carrying out the invention is illustrated in the accompanying drawing.

Figure 3:
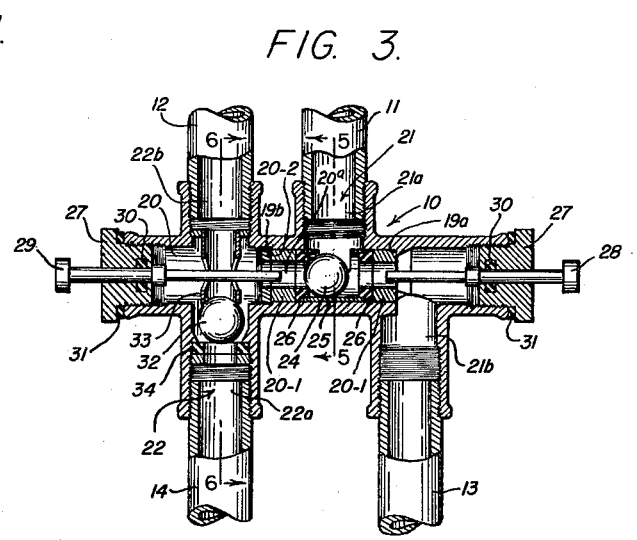
Figure 4:
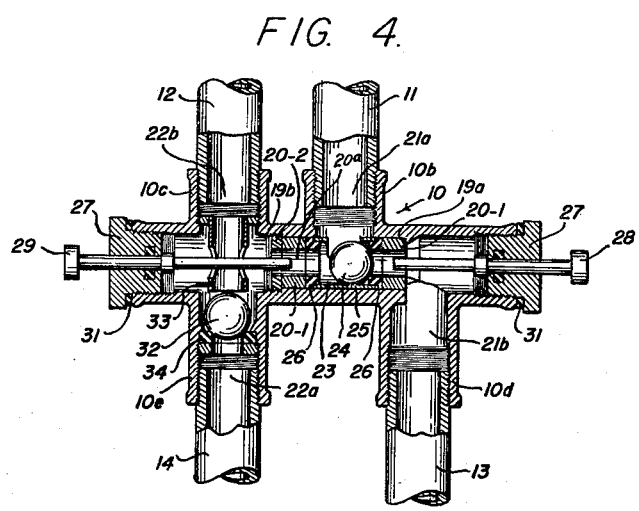
Figure 2:
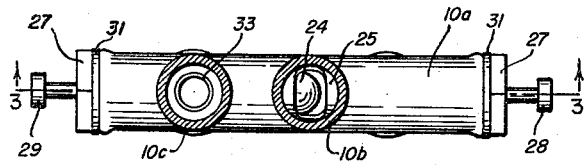
Figure 5:
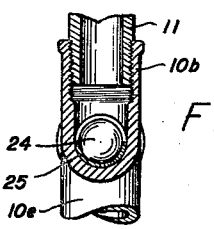

In the drawing:
FIG. 1 represents a view in front elevation of a typical installation of a valve of the invention in connection with a domestic type of exchange tank water softener, an intermediate portion of the tank being broken away for convenience of illustration;

FIG. 2, a horizontal section taken on the line 2—2 of FIG. 1, and drawn to an enlarged scale, the tank in the background being omitted;

FIG. 3, a vertical section taken on the line 3—3 of FIG. 2, the working parts of the valve being shown in the positions occupied for the supply of soft water to the service lines;

FIG. 4, a similar view, showing the position of the valve parts when the tank or connection fittings spring a leak or when the tank is being exchanged;

FIG. 5, a fragmentary vertical section taken on the line 5—5 of FIG. 3; and

Figure 6:
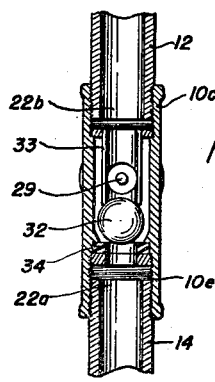

FIG. 6, a similar view taken on the line 6—6 of FIG. 3.

Referring to the drawings:

In the water softening installation of FIG. 1, the valve of this invention is shown at 10 as connected, at its top, to a hard water supply pipe 11 and a main service pipe 12 and, at its bottom, to a tank-inflow pipe 13 and a tank-outflow pipe 14.

Pipe 13 is connected by a standard type of quick coupling 15 to a tank-inflow fitting 16 of an exchange type water softener tank 17, and pipe 14 is similarly connected by a second coupling 15 to a tank-outflow fitting 18 of such water softener tank.

Valve 10 comprises a valve body 19, which is formed from a non-corrosive material, such as bronze, to define an elongate, rectilinear passage 20 therethrough, and a tank-inflow passage 21 and a tank-outflow passage 22 crossing passage 20 transversely thereof. Passages 21 and 22 are spaced apart in side-by-side relationship considered longitudinally of passage 20.

Valve body 19 is advantageously cast to shape and cored to produce rough-walled passages therethrough, and is then drilled and tapped in customary manner. In drilling the rough rectilinear passage 20, an annular shoulder 19a is left as an abutment seat for a reducing annulus 20–1 and a similar annular shoulder 19b, spaced apart along the passage, is left and tapped for the reception of a retainer 20–2.

Tank-inflow passage 21 has an inlet portion 21a and an outlet portion 21b, the latter being offset from the former in the direction away from the tank-outflow passage 22 to provide for a flow chamber 23, which is located between annular shoulders 19a and 19b preferably in axial alignment with inlet portion 21a and laterally disposed with respect to outlet portion 21b. Such flow chamber 23 is adapted to confine a freely movable, ball valve member 24, and, to this end, is advantageously provided by a cylindrical cage 25 equipped at its ends with removable and replaceable valve seats 26 of rubber or the like. Such valve seats 26 are located peripherally of rectilinear passage 20 at respectively opposite sides of inlet portion 21a of tank-inflow passage 21 and define respective ports for the passage of hard water flowing in through inlet portion 21a of the tank-inflow passage.

Ball valve member 24 is free to roll along cage 25 between the opposing valve seats 26, the two valve seats being spaced sufficiently far apart to insure adequate flow therethrough regardless of which of the two seats is involved in the seating of the ball at any given time. It should be noted that the internal diameters of cage 25 and ball 24 are equal or very nearly so, seating being accomplished substantially without lifting of the ball from the floor of the cage. In other words, the longitudinal axis of the cage passes substantially through the centers of the valve seats and the ball. A diameter of ¾" for the inside of the cage and for the ball and a length of 15/16" for the interior of the cage has been found to be very satisfactory.

The valve seats 26 are preferably respective rubber annuli, which are inserted and frictionally held in respectively opposite ends of the cage and which may, therefore, be easily replaced when worn. The ball 24 is advantageously lightweight, preferably being formed from a plastic material.

Cage 25 is installed in passage 20 by first inserting in such passage and against shoulder 19a the reducing annulus 20–1, by thereafter inserting the assembled cage, seats, and ball against such annulus, by then inserting a second reducing annulus 20–1 against the cage, and, finally, by screwing retainer 20–2 into threaded shoulder 19b to tightly clamp the previously inserted items in place.

Tank-outflow passage 22 has an inlet portion 22a and an outlet portion 22b in rectilinear alignment with each other.

The valve body 10 is preferably formed with an elongate main portion 10a having sets of laterals, 10b and 10c, and 10d and 10e, projecting oppositely therefrom, the rectilinear passage 20 being formed longitudinally of such main portion 10a, with its ends open, the inlet and outlet portions 21a and 21b of tank-inflow passage 21 being formed longitudinally of the respective laterals 10b and 10d, and the inlet and outlet portions 22a and 22b being formed longitudinally of the respective laterals 10e and 10c. The outer open ends of the several laterals 10b, 10c, 10d, and 10e of valve body 10 are threaded internally for connection with the pipes 11, 12, 13 and 14, respectively, while the open outer ends of main portion 10a of such valve body are also threaded internally for receiving respective closures, which, as here shown, are respective plugs 27 carrying plungers 28 and 29, respectively, for back and forth sliding movement axially thereof and axially of passage 20 at opposite sides of ball 24. Rubber O-rings 30 serve as packing for the respective plungers, and gaskets 31 serve to seal plugs 27 against leakage of liquid.

It will be noted from FIG. 4 that the central portion 20a of passage 20 serves as a by-pass passage for flow of hard water from inlet 21a directly to service line outlet 22b when ball 24 is seated against the right-hand seat 26, as indicated. For preventing back flow into tank 17 under these conditions, a check valve is provided in tank-outflow passage 22 between the inlet thereof and the by-pass passage. In the present instance, such check valve is a ball check 32 confined in inlet passage 22a by a rigid tubular guard 33, which depends from screw threaded anchorage in lateral 10c, and by ball check seat 34. Guard 33 is apertured as shown, for the passage therethrough of the stem of plunger 29.

When no water is being drawn from main service pipe 12 and when there is no leak in the system below valve 10, pressure is equalized throughout the system. Under these circumstances, ball 24 remains wherever it happens to be, but is free to respond to any pressure differential.

In use, the drawing of water at any point in the distribution piping system served by main service pipe 12 will cause ball 24 to seat against the left-hand seat 26, as in FIG. 3, by reason of the differential pressure existing between flow chamber 23 and by-pass 20a. Hard water from supply pipe 11 therefore flows through water softener tank 17 prior to passing into the distribution piping system.

When the ball closes either port the pressure of water in the system will hold the ball tightly against its seat.

If, for any reason, a leak develops in tank 17 or in the couplings 15 or pipes 13 and 14, inflow of water through tank inflow passage 21 unaccompanied by corresponding outflow through tank outflow passage 22 will induce ball 24 to contact seat 26 and close tank inflow passage 21 and open by-pass 20a as shown in FIG. 4, thereby effectively stopping the leak by cutting off flow thereto.

Ball 24 will seat against the right-hand seat 26 under the above circumstances, because outflow of water through the leak will inevitably be accompanied by inflow of water around ball 24, which either carries such ball and seats it firmly against right-hand seat 26, or, if such ball is already resting against such seat, firmly presses such ball against the seat.

When the service man prepares to exchange tank 17 for one containing regenerated ion-exchange material, he need merely release couplers 15. Ball 24 will automatically seat as in FIG. 4, precluding outflow through the valve. However, to guard against possible flooding during the exchange in the event water is being drawn from the service distribution system at the time, the service man should first push plunger 29 in, to force ball 24 against its right-hand seat, as in FIG. 4. Following the exchange, he should pull such plunger out to return it to the normal position shown, and should then push plunger 28 in, to pressurize the new tank. After satisfying himself that no leak has developed in the tank between regeneration plant and the particular installation, he should pull out such plunger 28 and leave the so-serviced system for continued use.

Whereas there is here illustrated and described a certain preferred construction which I presently regard as the best mode of carrying out my invention, it should be understood that various changes may be made without departing from the disclosed inventive subject matter particularly pointed out and distinctly claimed hereinbelow.

I claim:

1. A valve for controlling both the inflow to and the outflow from tanks, comprising a valve body defining a tank-inflow passage having inlet and outlet, a tank-outflow passage having inlet and outlet, and a by-pass passage interconnecting the two; a freely movable ball placed at the intersection of the by-pass passage with the tank-inflow passage, as a valve member; a valve seat for the ball, placed peripherally of the by-pass passage; a second valve seat for the ball, placed peripherally of the tank-inflow passage, downstream from the ball, the two valve seats being spaced apart sufficiently to afford free flow through the tank-inflow passage regardless of the seating of said ball; ball-confining means disposed across the tank-inflow passage, upstream from the ball, said valve seats and ball-confining means defining a flow chamber within which the ball is confined; and a check valve in the tank-outflow passage, between the inlet thereof and the by-pass passage.

2. The valve of claim 1, wherein there are additionally provided manually controlled means for displacing the ball from whichever of its seats it may be resting against at any given time.

3. The valve of claim 1, wherein the outlet portion of the tank-inflow passage is offset laterally from the inlet portion in a direction away from the by-pass passage, the flow chamber is in line with the said inlet portion, and the flow chamber opens into the said inlet portion at one side and into the by-pass passage at the opposite side.

4. The valve of claim 3, wherein there are additionally provided manually operable plungers extending through the walls of the valve body in mutual opposition at opposite sides of the ball and along the axes of the valve seats for displacing the ball from whichever of its seats it may be resting against at any given time.

5. The valve of claim 1, wherein the flow chamber is further defined and the ball-confining means is provided by an elongate cage within which the ball is free to roll back and forth.

6. The valve of claim 5, wherein the valve seats are respective annuli replaceably inset into opposite ends of the cage.

7. A valve for controlling both the inflow to and the outflow from tanks, comprising a valve body defining an elongate rectilinear passage therethrough, a tank-inflow passage crossing the rectilinear passage transversely thereof and having inlet and outlet portions, and a tank-outflow passage crossing the rectilinear passage transversely thereof to one side of the tank-inflow passage, considered longitudinally of the rectilinear passage, and having inlet and outlet portions, the outlet portions of the tank-inflow passage being offset from the inlet portion thereof in the direction away from the tank-outflow passage; a freely movable ball placed in the rectilinear passage in line with the inlet portion of the tank-inflow passage; a pair of valve seats for the ball placed peripherally of the rectilinear passage at respectively opposite sides of the inlet portion of the tank-inflow passage, to partially define a flow chamber for confining the ball, the two valve seats being spaced apart sufficiently to afford free flow through the tank-inflow passage regardless of the seating of said ball; ball-confining means in the inlet portion of the tank-inflow passage to further define said flow chamber; means closing the ends of the rectilinear passage; and a check valve in the tank-outflow passage, between the inlet thereof and the by-pass passage.

8. The inflow-outflow valve of claim 7, wherein plungers extend through the closed ends of the rectilinear passage in mutual opposition and into the vicinity of the flow chamber, for displacing the ball from whichever of its seats it may be resting against at any given time.

9. The valve of claim 7, wherein the flow chamber is further defined and the ball-confining means is provided by an elongate cage within which the ball is free to roll back and forth.

10. The valve of claim 9, wherein the valve seats are respective annuli replaceably inset into opposite ends of the cage.

References Cited in the file of this patent

UNITED STATES PATENTS

| | | | |
|---|---|---|---|
| 1,208,292 | Coen | Dec. 12, | 1916 |
| 1,653,613 | Bast | Dec. 27, | 1927 |
| 2,169,043 | Goehring | Aug. 8, | 1939 |
| 2,566,609 | Grosse | Sept. 4, | 1951 |
| 2,778,316 | Haight | Jan. 22, | 1957 |
| 2,906,281 | Pillote | Sept. 29, | 1959 |